(12) United States Patent
Idema et al.

(10) Patent No.: US 11,814,139 B1
(45) Date of Patent: Nov. 14, 2023

(54) ASSEMBLY FOR EXTENDING AND RETRACTING ELONGATED MARINE PERIPHERAL DEVICE

(71) Applicant: Brunswick Corporation, Mettawa, IL (US)

(72) Inventors: Matthew B. Idema, Rockford, MI (US); Daniel S. Scheske, Kentwood, MI (US); Bryan M. Ulmer, Grand Rapids, MI (US)

(73) Assignee: Brunswick Corporation, Mettawa, IL (US)

( * ) Notice: Subject to any disclaimer, the term of this patent is extended or adjusted under 35 U.S.C. 154(b) by 77 days.

(21) Appl. No.: 17/313,432

(22) Filed: May 6, 2021

(51) Int. Cl.
  *B63B 17/00* (2006.01)
  *H02P 23/24* (2016.01)
  *H02K 7/116* (2006.01)
  *F16M 13/02* (2006.01)
  *F16M 11/20* (2006.01)

(52) U.S. Cl.
  CPC .......... *B63B 17/00* (2013.01); *F16M 13/022* (2013.01); *H02K 7/1166* (2013.01); *H02P 23/24* (2016.02); *F16M 11/2021* (2013.01)

(58) Field of Classification Search
  CPC .. B63B 17/00; F16M 13/022; F16M 11/2021; H02P 23/27; H02K 7/1166; H01Q 1/125; H01Q 3/02
  USPC .......... 248/548–549, 184.1, 130, 138, 183.2, 248/185.1, 284.1, 291.1
  See application file for complete search history.

(56) References Cited

U.S. PATENT DOCUMENTS

| | | | | |
|---|---|---|---|---|
| 3,395,544 A | * | 8/1968 | Fisher, Sr. | B63C 5/04 248/548 |
| 4,055,845 A | * | 10/1977 | Ladrick | H01Q 1/103 343/882 |
| 6,038,996 A | * | 3/2000 | Giles | B63B 21/243 114/304 |
| 7,461,995 B2 | | 12/2008 | Burnley | |

(Continued)

OTHER PUBLICATIONS

Boks et al., "System and Peripheral Devices for a Marine Vessel" Unpublished U.S. Appl. No. 17/227,959, filed Apr. 12, 2021 (specification and drawings only).

(Continued)

*Primary Examiner* — Christopher Garft
(74) *Attorney, Agent, or Firm* — ANDRUS INTELLECTUAL PROPERTY LAW, LLP

(57) ABSTRACT

An assembly for extending and retracting an elongated peripheral device with respect to a supporting surface of a marine vessel includes a housing and an arm pivotably coupled to the housing. An electric motor is located in the housing and has an output shaft coupled to the arm. The electric motor changes an orientation of the housing and the arm with respect to one another. A mount coupled to the housing supports the peripheral device. As the electric motor changes the orientation of the housing and the arm with respect to one another, the mount and the peripheral device are simultaneously extended or retracted with respect to the supporting surface. A controller varies the power provided to the electric motor in response to determining that the peripheral device has encountered an obstacle while being extended or retracted with respect to the supporting surface.

10 Claims, 11 Drawing Sheets

(56) References Cited

U.S. PATENT DOCUMENTS

| | | | |
|---|---|---|---|
| 7,525,507 B1* | 4/2009 | Henry, Jr. | H01Q 1/125 |
| | | | 343/882 |
| 8,499,495 B2* | 8/2013 | Houser | E05F 15/63 |
| | | | 49/340 |
| 9,480,534 B2 | 11/2016 | Bowling et al. | |
| 9,908,597 B1 | 3/2018 | Benson | |
| 10,260,566 B2* | 4/2019 | Salerno | F16C 41/004 |
| 2008/0179478 A1* | 7/2008 | Lee | B60R 11/00 |
| | | | 248/276.1 |
| 2013/0134196 A1* | 5/2013 | Lee | B62J 50/225 |
| | | | 224/448 |
| 2016/0268669 A1* | 9/2016 | Wilcox | F16M 11/18 |
| 2019/0341671 A1 | 11/2019 | Conrad | |
| 2021/0221283 A1* | 7/2021 | Yudelevich | B60Q 1/503 |

OTHER PUBLICATIONS

E-Riggers, "Electric Antenna Mount," website, available at http://www.e-riggers.com/our-story.htrnl, last visited Apr. 20, 2021.
E-Riggers, "Electric Anchor Light," website, available at http://www.e-riggers.com/services.htrnl, last visited Apr. 20, 2021.
Taco Marine, "Grand Slam 850 Electric Antenna Mount," website, available at https://tacomarine.com/electronics-store-gs-850-2, last visited Apr. 20, 2021.

\* cited by examiner

ASSEMBLY FOR EXTENDING AND RETRACTING ELONGATED MARINE PERIPHERAL DEVICE

FIELD

The present disclosure relates to elongated peripheral devices installed on marine vessels, including but not limited to pole-mounted lights or other electronic devices and antennas.

BACKGROUND

Unpublished U.S. patent application Ser. No. 17/227,959, filed Apr. 12, 2021, which is hereby incorporated by reference herein, discloses a system for a marine vessel including a peripheral device having an actuator configured to move part of the peripheral device between a retracted position and an extended position. A first serial bus is configured to connect the peripheral device to other peripheral devices. A controller is operatively connected to the actuator and is in signal communication with the first serial bus. A sensor is coupled to the controller via a second serial bus. The controller is configured to activate the actuator to move the part of the peripheral device from the extended position to the retracted position and from the retracted position to the extended position in response to information from the sensor.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, an assembly for extending and retracting an elongated peripheral device with respect to a supporting surface of a marine vessel includes a housing configured to be coupled to the supporting surface and an arm pivotably coupled to the housing. An electric motor is located in the housing and has an output shaft coupled to the arm. The electric motor is configured to change an orientation of the housing and the arm with respect to one another. A controller is configured to control power provided to the electric motor. A mount is coupled to the housing, the mount being configured to support the peripheral device. The assembly is configured such that as the electric motor changes the orientation of the housing and the arm with respect to one another, the mount and the peripheral device are simultaneously extended or retracted with respect to the supporting surface. The controller is configured to vary the power provided to the electric motor in response to determining that the peripheral device has encountered an obstacle while being extended or retracted with respect to the supporting surface.

According to another example, an assembly for extending and retracting an elongated peripheral device with respect to a supporting surface of a marine vessel includes a housing configured to be coupled to the supporting surface and an arm having a first end pivotably coupled to the housing. A mount is coupled to a second end of the arm, and the mount is configured to support the peripheral device. A breakaway feature is located between the arm and the mount, and the breakaway feature allows the mount and the peripheral device to pivot with respect to the arm in response to application of force to the mount greater than a given threshold force. An electric motor is located in the housing and has an output shaft coupled to the arm. The electric motor is configured to pivot the arm with respect to the housing. The assembly is configured such that as the electric motor pivots the arm with respect to the housing, the mount and the peripheral device are simultaneously extended or retracted with respect to the supporting surface.

According to another example, an assembly for extending and retracting an elongated peripheral device with respect to a supporting surface of a marine vessel includes a housing configured to be coupled to the supporting surface and an arm having a first end pivotably coupled to the housing. An electric motor located in the housing has an output shaft coupled to the arm. The electric motor is configured to pivot the arm with respect to the housing. A controller is configured to control power provided to the electric motor. A mount is coupled to a second end of the arm, and the mount is configured to support the peripheral device. The assembly is configured such that as the electric motor pivots the arm with respect to the housing, the mount and the peripheral device are simultaneously extended or retracted with respect to the supporting surface. The controller is configured to vary the power provided to the electric motor in response to determining that the peripheral device has encountered an obstacle while being extended or retracted with respect to the supporting surface.

BRIEF DESCRIPTION OF THE DRAWINGS

Examples of mounts for marine peripheral devices are described with reference to the following Figures. The same numbers are used throughout the Figures to reference like features and like components.

DETAILED DESCRIPTION

Figure 1:
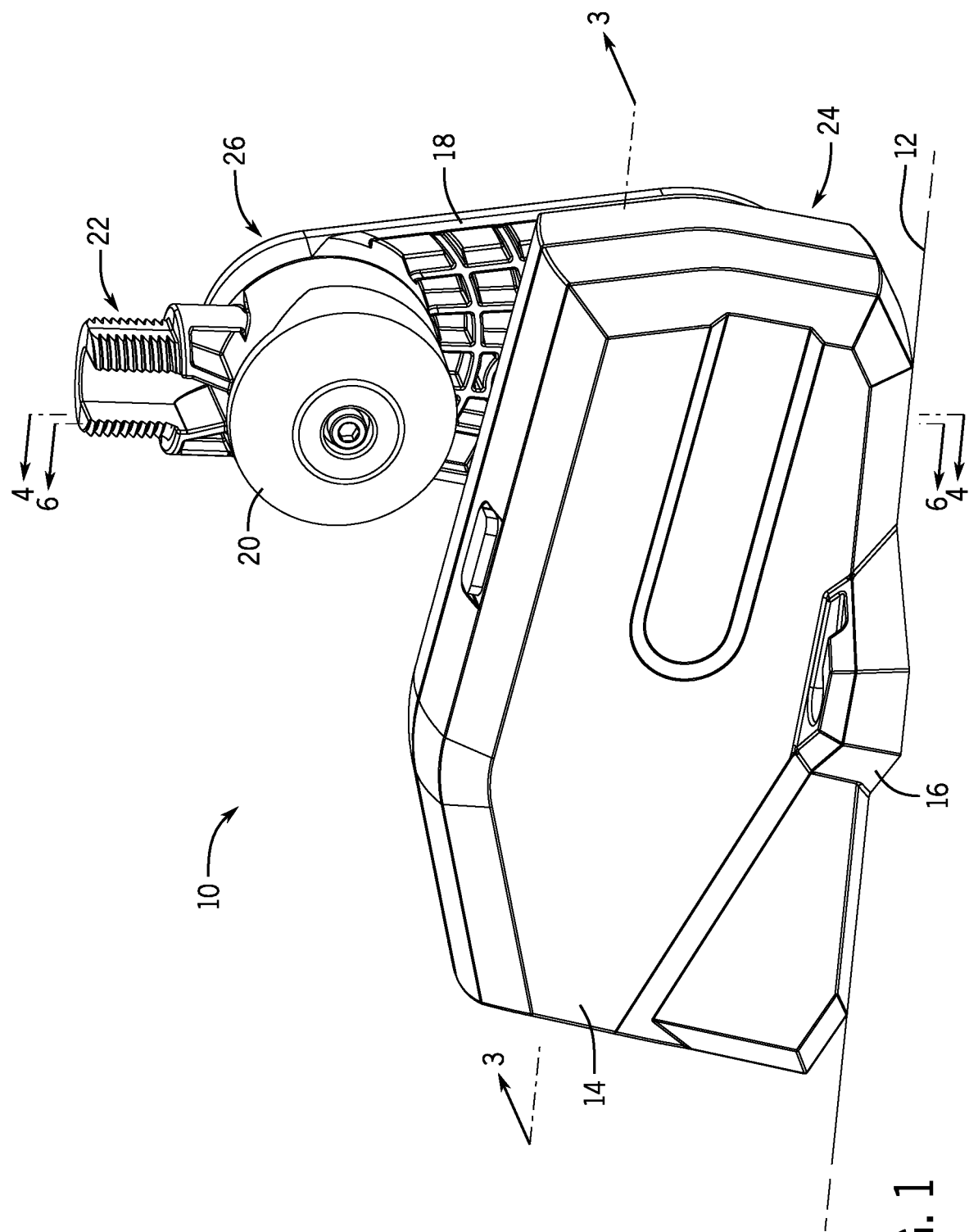
FIG. 1 is a perspective view of a first embodiment of an assembly for extending and retracting an elongated peripheral device with respect to a supporting surface of a marine vessel.
Figure 2:
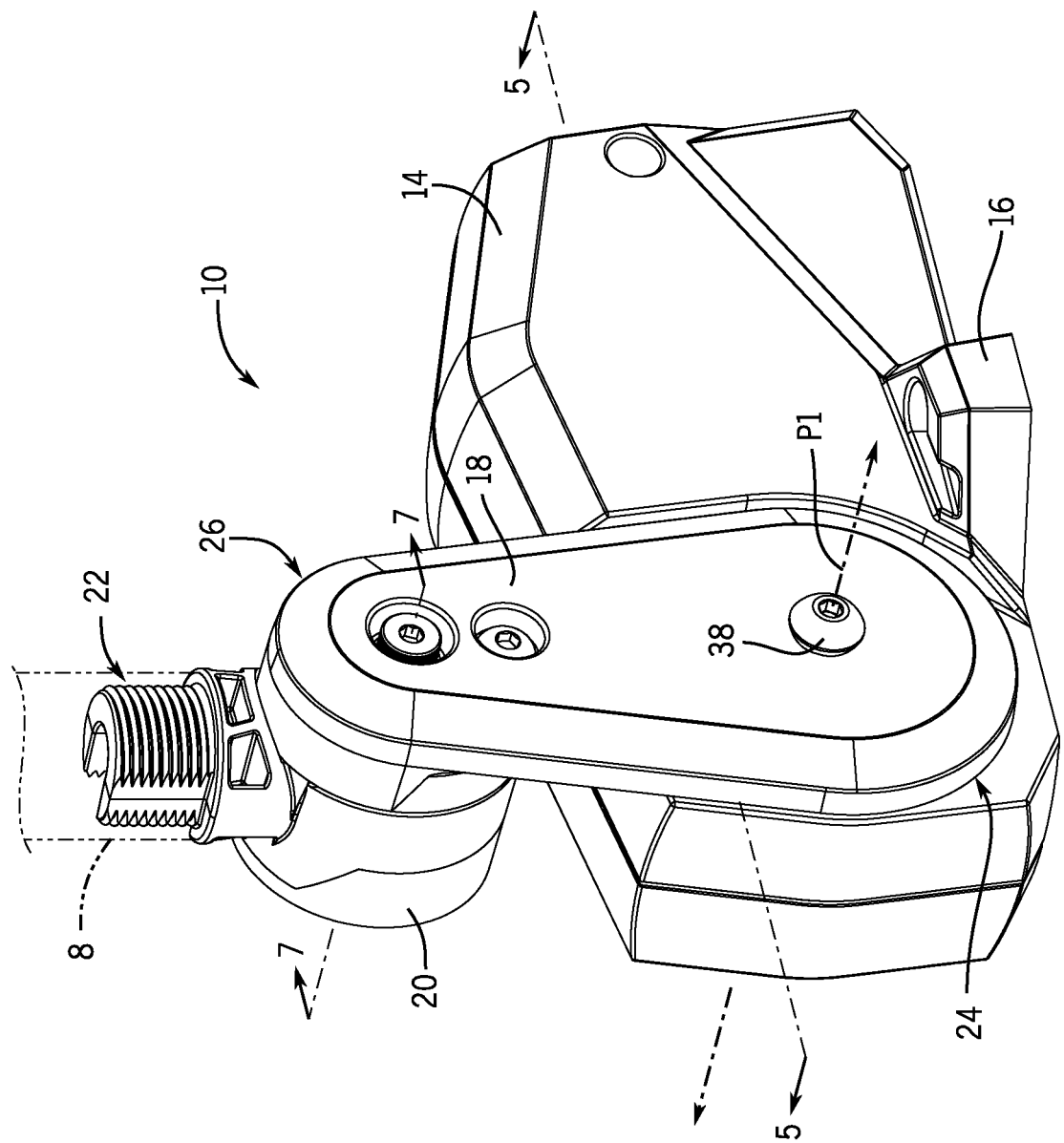
FIG. 2 illustrates an opposite perspective view thereof.

FIGS. 1-7 illustrate an assembly 10 for extending and retracting an elongated peripheral device 8 (partially shown in phantom in FIG. 2) with respect to a supporting surface 12 of a marine vessel. The elongated peripheral device may be any type of pole-mounted peripheral device, such as a light or other electronic device, or a VHF antenna. The supporting surface 12 of the marine vessel may be the deck, the gunwale, the bridge, the hardtop, the hull, or any other surface suitable for mounting the assembly 10 and the peripheral device. Referring specifically to FIGS. 1 and 2, the assembly 10 includes a housing 14 configured to be coupled to the supporting surface 12. Here, the housing 14 is configured to be connected directly to the supporting surface 12 by way of screws through holes in mounting flanges 16; however, the attachment could be made by way of bolts, adhesive, or other known attachment mechanisms. An arm 18 is pivotably coupled to the housing 14 along pivot axis P1 (FIG. 2). A mount 20 is also coupled to the housing 14, here, by way of the arm 18. More specifically, a first end 24 of the arm 18 is pivotably coupled to the housing 14, and the mount 20 is coupled to a second end 26 of the arm 18. The mount 20 is configured to support the peripheral device (not shown), such as by attachment of a threaded lower end of the peripheral device to a threaded portion 22 of the mount 20. Other attachment mechanisms could be used, such as a friction fit, a pinned connection, a snap connection, or other known appropriate mechanism.

Note that the threaded portion 22 of the mount 20 is configured such that it can receive either a pole for a light or an antenna having a correspondingly threaded surface. This means that the below-described impact protection features of the assembly 10 can be used with either type of peripheral device, depending on the user's needs. The housing 14 provides noise reduction and protection for internal components, while at the same time reducing installation complexity, as a single cable or wire and fasteners for the mounting flanges 16 may be all that are needed to install the assembly on the supporting surface 12 of the boat.

Figure 3:
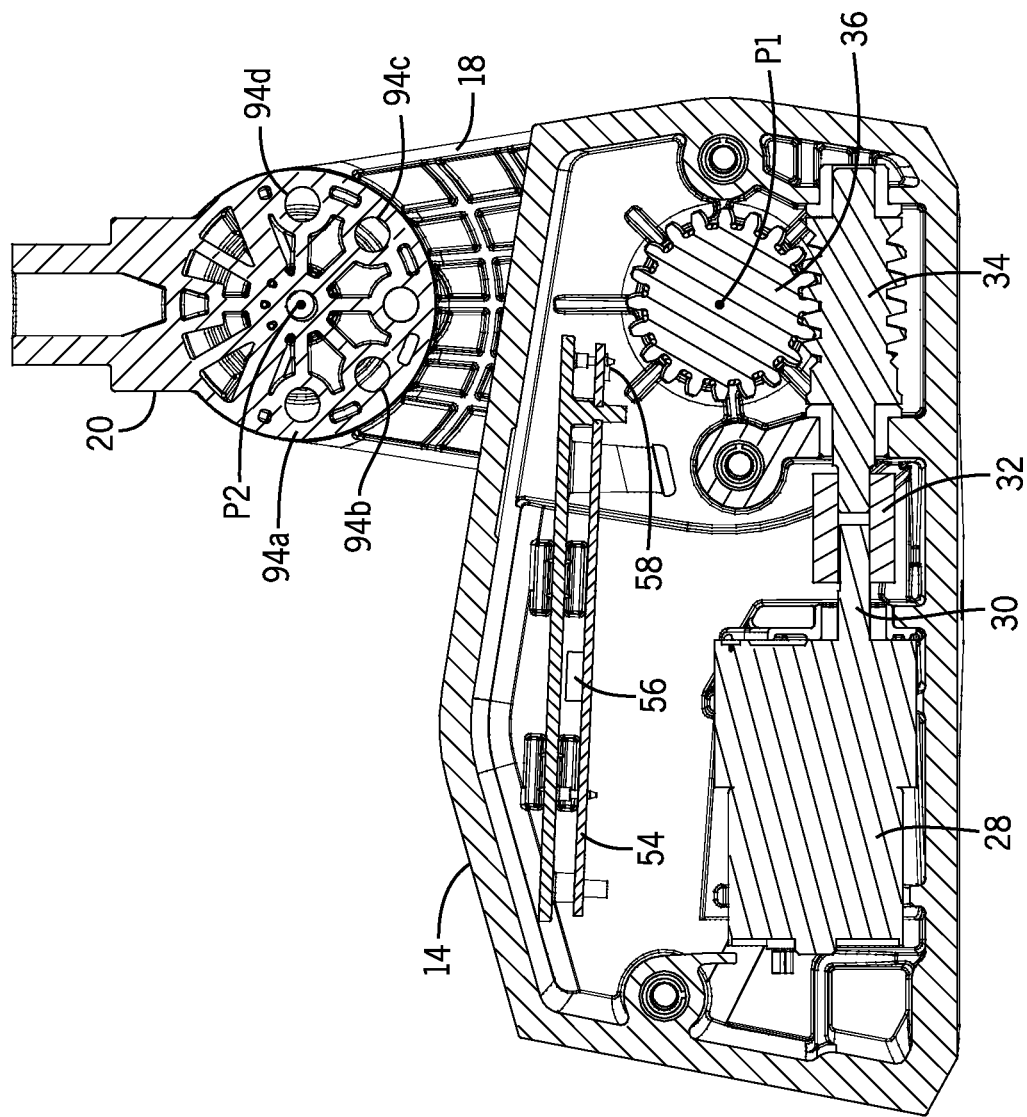
FIG. 3 is a cross-sectional view thereof, taken along the line 3-3 in FIG. 1.
Figure 4:
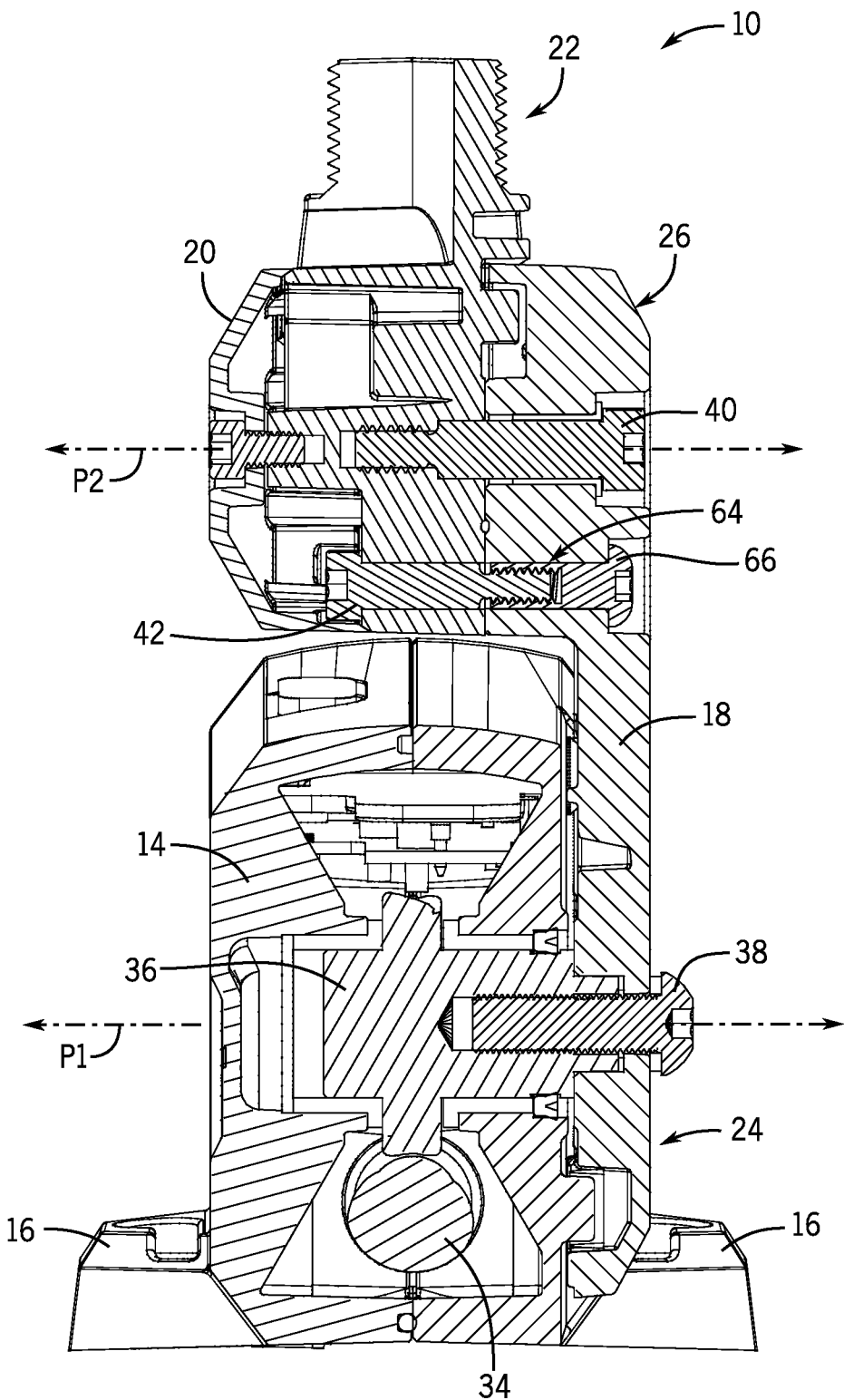
FIG. 4 is a cross-sectional view thereof, taken along the line 4-4 in FIG. 1.

Referring to FIG. 3, an electric motor 28 is located in the housing 14 and has an output shaft 30 coupled to the arm 18. The electric motor 28 could be a permanent magnet DC motor, a brushless DC motor, an AC motor, or any other type of small motor appropriate for similar purposes. The electric motor 28 is operable at variable speeds. The electric motor 28 is configured to change an orientation of the housing 14 and the arm 18 with respect to one another. More specifically, in this embodiment, the electric motor 28 is configured to pivot the arm 18 with respect to the housing 14. Here, the output shaft 30 is connected by way of a connector 32 to a worm gear 34, and rotation of the output shaft 30 rotates the worm gear 34. The worm gear 34 is meshed with the teeth of a gear 36, which gear 36 rotates about pivot axis P1 as the worm gear 34 turns. FIG. 4 shows how the arm 18 is connected to the gear 36 by way of a bolt 38. Rotation of the gear 36 results in pivoting of the arm 18 with respect to the housing 14 about pivot axis P1. The components are designed such that rotation of the output shaft 30 of the motor 28 in a first direction pivots the arm 18 in a given direction, and rotation of the output shaft 30 of the motor 28 in a second direction pivots the arm 18 in the opposite direction. Other configurations for coupling the output from the motor 28 to the input to the arm 18 are possible, such as a direct connection or other type of geared connection than that shown herein.

The assembly 10 is configured such that as the electric motor 28 changes the orientation of the housing 14 and the arm 18 with respect to one another, for example, by pivoting the arm 18 with respect to the housing 14, the mount 20 and the peripheral device are simultaneously extended or retracted with respect to the supporting surface 12. In this example, the assembly 10 is configured such that as the electric motor 28 pivots the arm 18 with respect to the housing 14, the mount 20 and the peripheral device are simultaneously extended or retracted with respect to the supporting surface 12. This is because, as shown in FIG. 4, the mount 20 is connected to the second end 26 of the arm 18 by way of bolt 40 and shear pin 42. Thus, the mount 20 and any peripheral device 8 attached thereto move with the arm 18 as it pivots about pivot axis P1 under the power of the motor 28.

Figure 5:
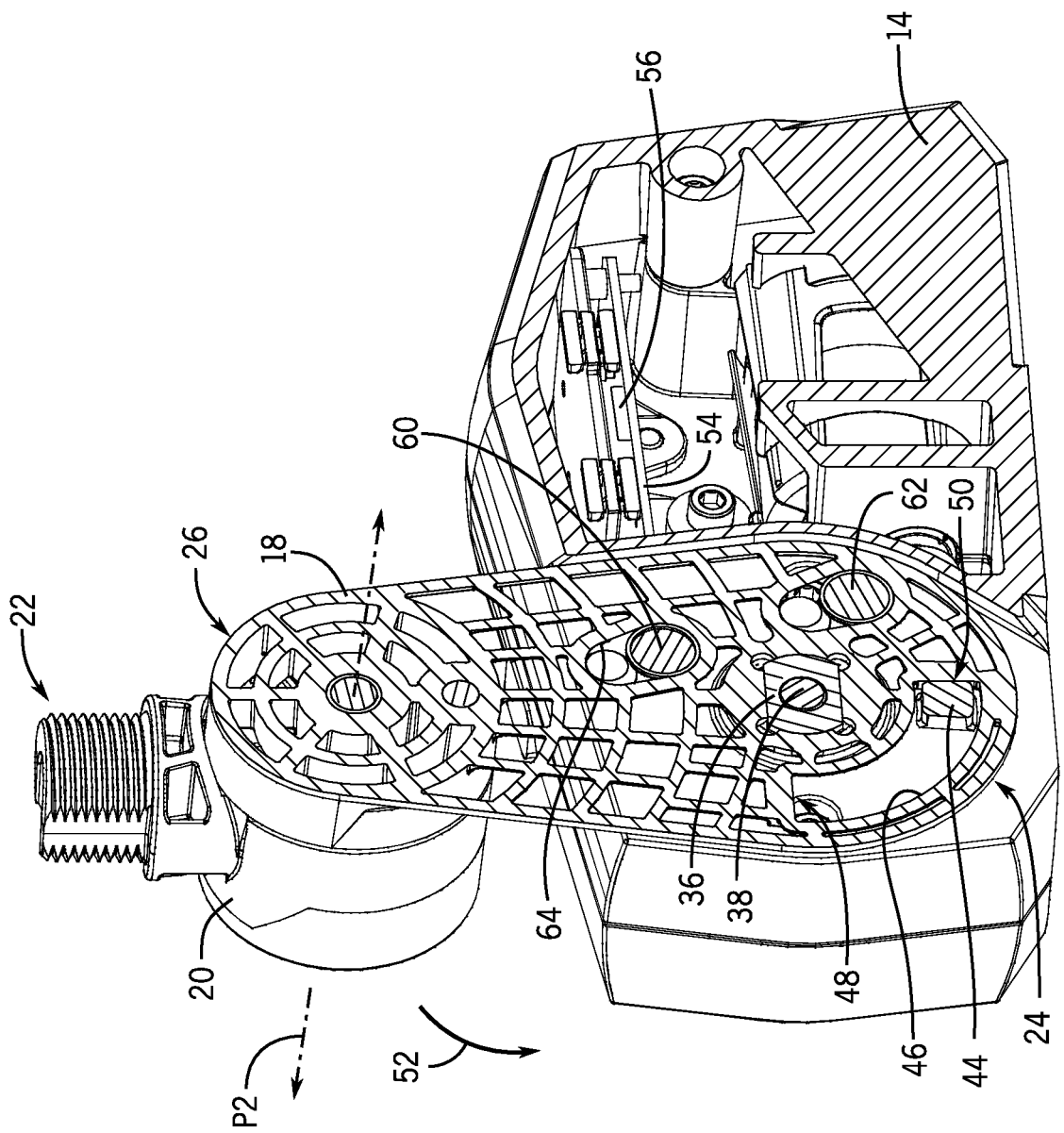
FIG. 5 is a cross-sectional view thereof, taken along the line 5-5 in FIG. 2.

FIG. 5 shows features of the housing 14 and arm 18 that limit travel of the arm 18 as it pivots. Specifically, a projection 44 extends from the side of the housing 14 that faces the arm 18. The projection 44 can be molded as part of the side of the housing 14 or can be a separate component that is attached to the side of the housing 14. The projection 44 fits within a channel 46 formed in the side of the arm 18 that faces the housing 14. The projection 44 and channel 46 are designed such that the projection 44 can slide within the channel 46 until it reaches one of two end surfaces 48, 50 of the channel 46. When the projection 44 contacts one of the two end surfaces 48, 50 of the channel 46, the arm 18 cannot pivot any further in the direction it had been pivoting.

FIG. 5 shows the projection 44 contacting the end surface 50 of the channel 46. The arm 18 is therefore at the extended (here, upright or vertical) limit of its travel. The arm 18 can pivot downward in the direction of arrow 52 until the projection 44 contacts end surface 48. This would be the extent of the retracted (here, horizontal) limit of its travel. The extended position shown in FIG. 5 and the retracted position described above are with reference to the orientation of the housing 14 as being attached to a horizontal flat surface in the orientation shown (i.e., with the output shaft 30 of the motor 28 oriented horizontally). If the housing 14 were installed on a vertical surface, with the motor's output shaft 30 vertically upright, the extended position might be accomplished by moving the arm 18 until the projection 44 contacts the end surface 48, while the retracted position might be accomplished by moving the arm 18 until the projection 44 contacts the end surface 50.

Referring to FIGS. 3 and 5, the housing 14 also holds and supports a circuit board 54. The circuit board 54 in turn supports a controller 56 configured to control power provided to the electric motor 28. The power can be provided from a power source such as a battery located in the housing 14 or from a wired connection to an external battery such as a dedicated or house battery aboard the marine vessel. The motor 28 may have a built-in driver, to which the controller 56 may be electrically connected, although such electrical connection is not shown herein. Alternatively, a separate motor driver chip can be provided on the circuit board 54.

The controller 56 may be communicatively connected to one or more user input devices at a helm of the marine vessel, such as wirelessly, by way of a communications bus, or via powerline communication. In this way, the operator can manipulate a user input device at the helm, such as a keypad, touch-sensitive screen, button, or the like, to command the controller 56 to connect power from the power source to the motor 28 in order to extend or retract the mount 20 and peripheral device 8 coupled thereto with respect to the supporting surface 12. Additionally or alternatively, a wireless remote control device can be used to command the controller 56 to provide power to the motor 28 in order to extend or retract the mount 20. In other examples, a switch could be provided on the housing 14 of the assembly 10 itself as an additional or alternative means for activating the motor 28 to pivot the arm 18 and mount 20. The switch could be connected to the controller 56 or directly to the motor 28. Thus, the present assembly 10 can be installed with a single cable providing power and optionally communications to the controller 56 and/or motor 28.

In some examples, the controller 56 may include a computing system that includes a processing system, storage system, software, and input/output (I/O) interfaces. The controller 56 may be part of or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). The processing system can comprise a microprocessor, including a control unit and a processing unit, and other circuitry, such as semiconductor hardware logic, that retrieves and executes software from the storage system. The storage system can comprise any storage media readable by the processing system and capable of storing software. The storage system can include volatile and non-volatile, removable and non-removable media implemented in any method or technology for storage of information, such as computer-readable instructions, data structures, software program modules, or other data. Non-limiting examples of storage media include random access memory, read-only memory, flash memory, virtual and non-virtual memory, or any other medium which can be used to store the desired information and that may be accessed by an instruction execution system. The storage media can be a transitory storage media or a non-transitory storage media such as a non-transitory tangible computer readable medium. In the present example, the controller 56 is a microcontroller unit (MCU).

According to the present disclosure, the controller 56 is configured to vary the power provided to the electric motor 28 in response to determining that the peripheral device 8 connected to the mount 20 has encountered an obstacle while being extended or retracted with respect to the supporting surface 12. The controller 56 determines that the peripheral device 8 has encountered an obstacle by determining that the current provided to the electric motor 28 is above a predetermined threshold current. As is known, generally, it will require current within a given range to pivot the arm 18, mount 20, and a given peripheral component attached thereto about the pivot axis P1. Although a heavier peripheral component may require more current and a lighter peripheral component may require less current, in general, for a given weight of peripheral device, a given motor, and given components coupling the two to one another, the current required to move the peripheral device can be measured and averaged to determine what current is typically required. If the controller 56 determines that the current is significantly higher than that typical average current, the controller 56 may vary the power to the electric motor 28.

The controller 56 can be configured to compare the current provided to the electric motor 28 to a predetermined threshold current, which may be saved in the memory of the controller 56. The predetermined threshold current may be at least 1.25 up to 10 times the average current typically required to pivot the arm 18, mount 20, and peripheral device 8 about the pivot axis P1. The ratio of the predetermined threshold current to the typical average current will depend on the motor 28, gear train, and other factors affecting efficiency of the assembly 10, and can be determined by experimentation. If the peripheral device 8 has encountered an obstacle, the current to the motor 28 will be higher than typical, as the motor 28 is in that instance working against an external force preventing the peripheral device 8 from moving. The predetermined threshold current is therefore intended to represent a current that the motor 28 would supply when working against an external force other than just wind—for example, a solid object. The predetermined threshold current is ideally below the current at which the motor 28 will stall because the motor 28 would sit at the stall current and never reach the predetermined threshold otherwise.

If the motor 28 has a built-in motor driver, it may also have a built-in current sensor on an integrated circuit. The controller 56 can be configured to receive this current measurement and compare it to the predetermined threshold current. It should be understood that the controller 56 could instead compare the voltage or the power running through the motor 28 to a threshold voltage or power in other embodiments. In other words, it is not required that the controller actually measure or calculate "current" precisely to determine that the peripheral device 8 has encountered an obstacle. Furthermore, the controller 56 can be configured to require that the current is above the threshold current for more than a threshold amount of time before the controller 56 will cause the motor 28 to stop and/or reverse direction. For example, the threshold amount of time could be on the order of 50 milliseconds to 1 second.

The controller 56 can be configured to vary the power provided to the electric motor 28 in different ways in response to determining that the peripheral device 8 has encountered an obstacle while being extended or retracted with respect to the supporting surface 12. In one example, the controller 56 is configured to simply stop the electric motor 28, stopping the arm 18, mount 20, and peripheral device 8 where they are. The controller 56 can do this by discontinuing providing power to the leads of the motor 28, or the controller 56 can brake the motor 28 by applying an equal voltage to both leads of the motor 28. In another example, the controller 56 is configured to reverse a direction of the electric motor's output shaft 30 in response to determining that the peripheral device 8 has encountered an obstacle while being extended or retracted with respect to the supporting surface 12. For example, the controller 56 may apply an equal voltage to both leads of the motor 28, thereby stopping the motor 28, and then reverse the direction of current to the motor 28.

There is an instance in which the controller 56 may determine that the current provided to the electric motor is greater than the threshold current, but it may not be appropriate to reverse the direction of the output shaft 30. This occurs when the arm 18 is nearing the ends of its total allowable travel with respect to the housing 14. As noted hereinabove, the arm 18 can only pivot so far with respect to the housing 14 due to the projection 44 on the housing 14 contacting end surfaces 48, 50 within the channel 46 on the arm 18. These end surfaces 48, 50 act as hard stops, and when the projection 44 contacts one of the end surfaces 48, 50, the current through the motor 28 will be higher than it would otherwise be were the projection in the channel 46 between the hard stops and likely would be higher than the predetermined threshold current mentioned herein above. If the controller 56 were configured to reverse the direction of the output shaft 30 under these circumstances, the arm 18 would continually pivot up and down with respect to the housing 14, as the projection 44 contacted the end surface 48, reversed direction, then contacted the end surface 50, reversed direction, then contacted the end surface 48, etc. In order to prevent this from happening, the controller 56 is configured not to reverse the direction of the electric motor's output shaft 30 in response to determining that the mount 20 is within a threshold distance of being fully extended or fully retracted with respect to the supporting surface 12, despite having determined that the current provided to the electric motor 28 is above the predetermined threshold current.

Figure 6:
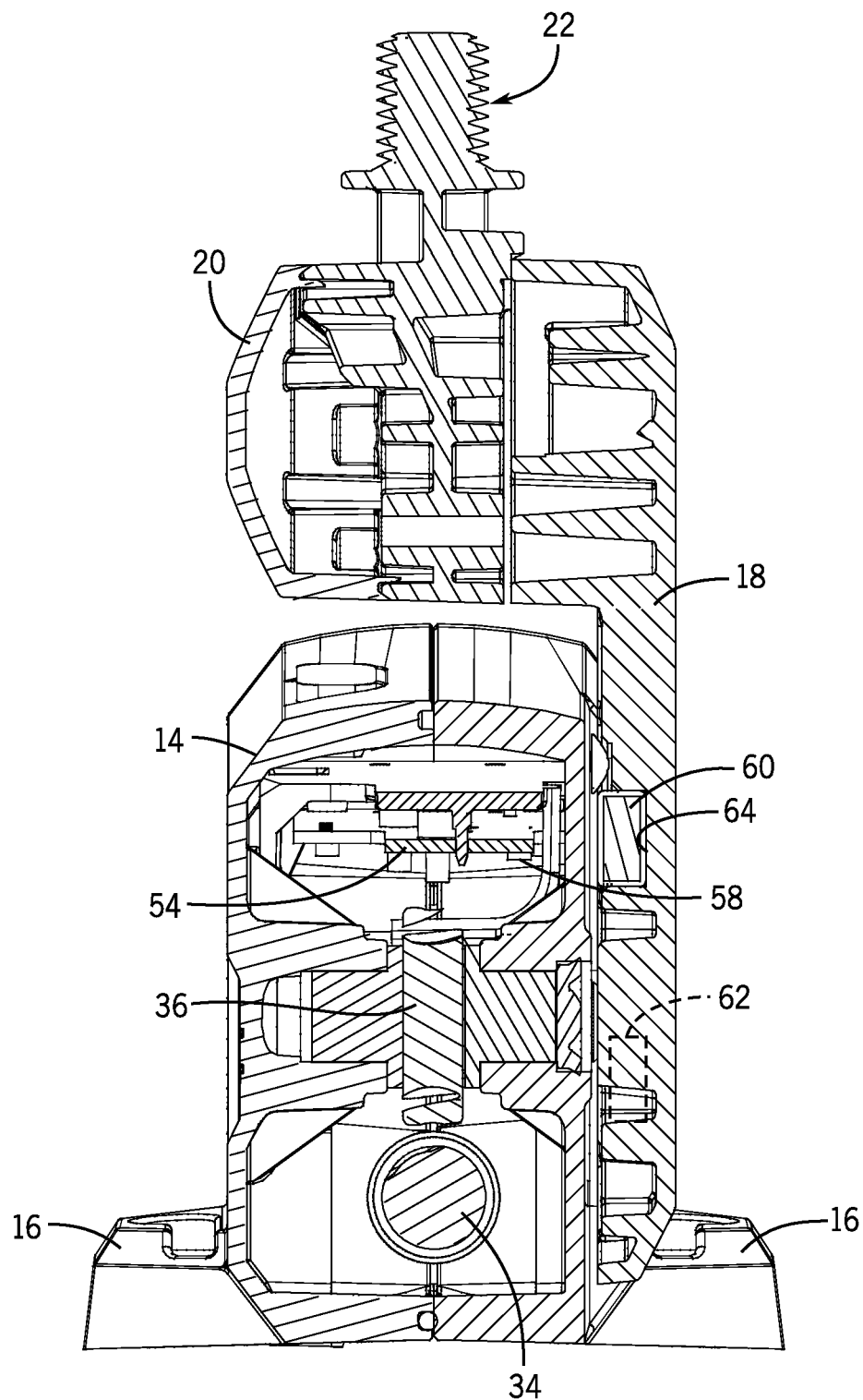
FIG. 6 is a cross-sectional view thereof, taken along the line 6-6 in FIG. 1.

The controller 56 can be configured to determine that the mount 20 is within a threshold distance of being fully extended or fully retracted with respect to the supporting surface 12 by way of a sensor or sensors installed on or in the housing 14, such as on the circuit board 54. With reference to FIGS. 4-6, a Hall effect sensor 58 (FIG. 6) is located on the circuit board 54 and electrically connected to the controller 56. A pair of magnets 60, 62 (FIG. 5) are attached to the arm 18. The magnets 60, 62 are located in recesses (one of which is shown at 64 in FIG. 6) in the surface of the arm 18 that faces the housing 14 such that the magnets 60, 62 do not interfere with pivoting of the arm 18 with respect to the housing 14. One of the magnets 60 or 62 has its south pole facing the housing 14, while the other of the magnets 62 or 60 has its north pole facing the housing 14. In the upright position of the arm 18 shown here, with the projection 44 contacting the end surface 50, the magnet 60 is more proximate the Hall effect sensor 58 than is the magnet 62. However, when the arm 18 is rotated in the direction of the arrow 52 (FIG. 5) until the projection 44 contacts the end surface 48, the magnet 62 would be more proximate the Hall effect sensor 58 than the magnet 60. Thus, the Hall effect sensor 58 can relay information to the controller 56 that allows the controller 56 to determine if the arm 18 is nearing one of its hard stops and which hard stop (end surface 48 or 50) the arm 18 is nearing.

In response to the controller 56 determining that one of the magnets 60 or 62 is approaching the Hall effect sensor 58, the controller 56 is configured not to reverse the direction of the motor's output shaft 30 even if the controller 56 receives information indicating that the current provided to the motor 28 is above the threshold. In effect, the arm 18 being near one of its hard stops turns off or suppresses the reverse-rotation functionality. The controller 56 can also be configured to slow the motor 28 down in response to determining that the mount 20 is within the threshold distance of being fully extended or fully retracted with respect to the supporting surface 12. This can allow the electric motor 28 to move the arm 18 to a position where the end surface 48 or 50 is touching the projection 44, thereby limiting free play in the system.

In still other examples, the assembly 10 could be provided with other types of sensors to determine if the peripheral device 8 is nearing one of the limits of its travel and/or is about to encounter an obstacle. For example, a force sensor such as a strain gauge could be installed on the arm 18 to sense when the force on the arm 18 is greater than a threshold. The strain gauge could be used in addition to or instead of the power/current sensing algorithm described herein above for purposes of stopping and/or reversing direction of the motor 28. An optical (e.g. camera) or proximity sensor could be installed on or near the assembly 10, which could signal the controller 56 that the peripheral device 8 is about to encounter an obstacle within the field of the optical or proximity sensor.

The Hall effect sensor 58 and magnets 60, 62 also allow the controller 56 to determine the position of the arm 18 with respect to the housing 14, which position the controller 56 can then cause to be displayed to the user at a location remote from the assembly 10. For example, the controller 56 can be configured to illuminate a light or present another type of visual display to the user at the helm and/or remote control device for the assembly 10. For example, the controller 56 can determine that the arm 18 is fully extended when the Hall effect sensor 58 provides information indicating that the magnet 60 is closest to the Hall effect sensor 58, and the controller 56 can determine that the arm 18 is fully retracted when the Hall effect sensor 58 provides information indicating that the magnet 62 is closest to the Hall effect sensor. In some examples, the controller 56 can be configured to calculate or look up a position of the arm 18 between its two hard stops based on the information from the Hall effect sensor 58, and to report this to the user as well.

Figure 7:
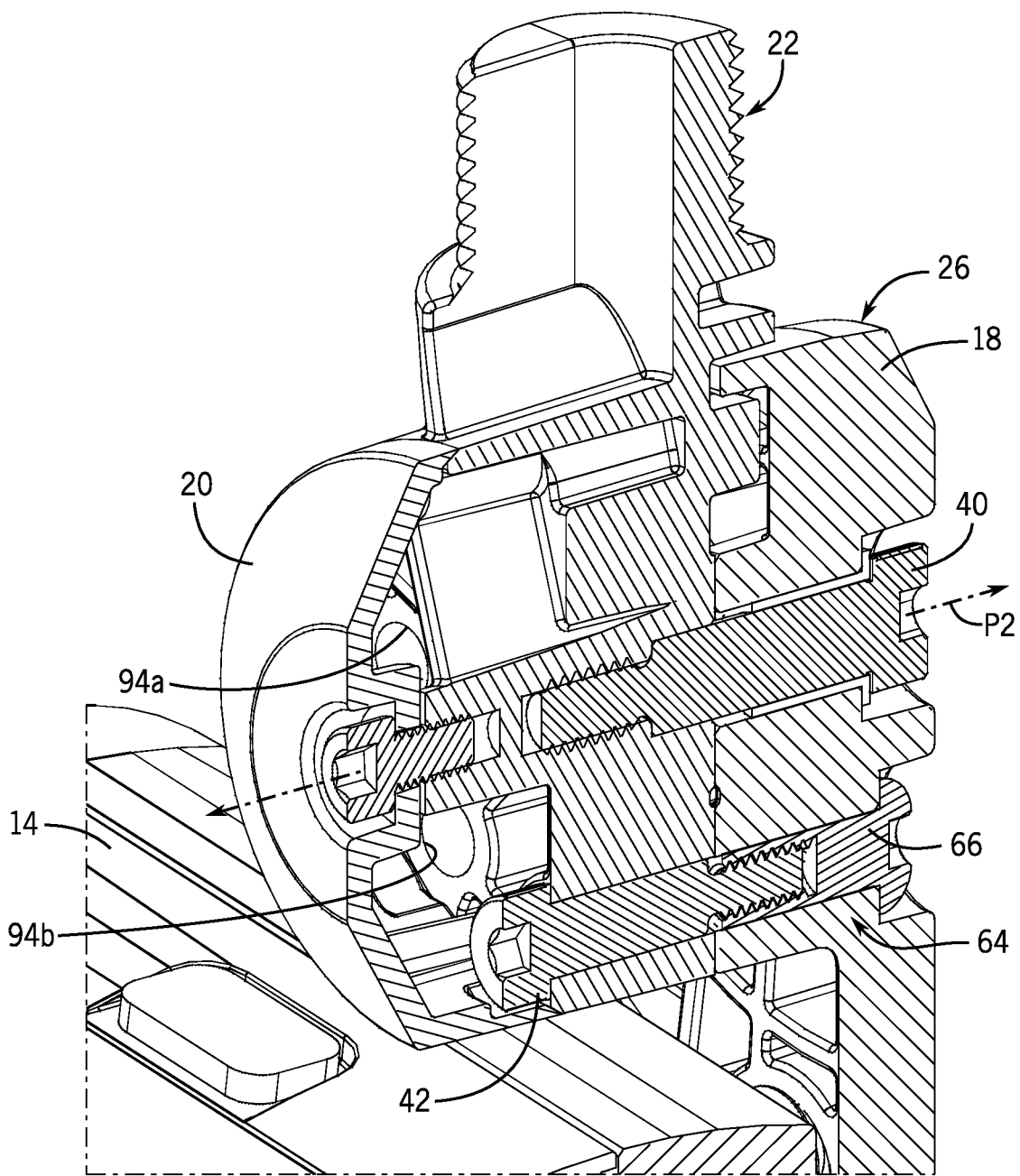
FIG. 7 is a cross-sectional view of a portion thereof, taken along the line 7-7 in FIG. 2.
Figure 8:
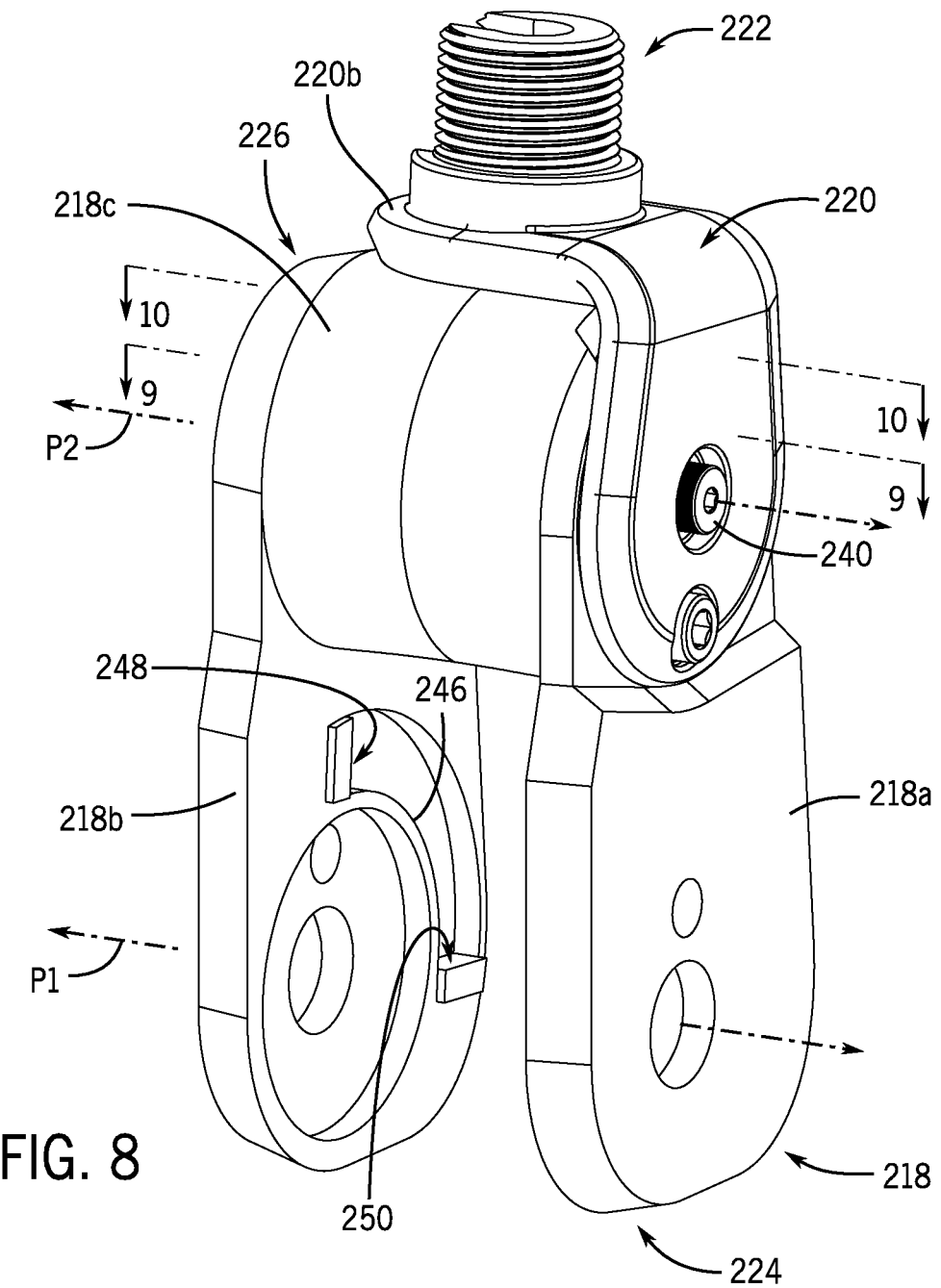
FIG. 8 is a perspective view of an alternative embodiment of an arm and a mount for use in the assembly of the present disclosure.

According to another aspect of the present disclosure, referring to FIGS. 4 and 7, the assembly 10 further includes a breakaway feature 64 located between the housing 14 and the mount 20. The breakaway feature 64 allows the mount 20 and the peripheral device 8 attached thereto to pivot with respect to the housing 14 in response to application of force to the mount 20 greater than a given threshold force. In this example, the mount 20 is coupled to the second end 26 of the arm 18 by way of the breakaway feature 64, and thus the breakaway feature 64 is more specifically located between the arm 18 and the mount 20, and the breakaway feature 64 allows the mount 20 and the peripheral device to pivot with respect to the arm 18 in response to application of force to the mount 20 greater than a given threshold force. The breakaway feature 64 comprises the above-noted shear pin 42 connected between the mount 20 and the arm 18 that prevents the mount 20 from pivoting with respect to the arm 18 unless force greater than the given threshold force is applied to the mount 20. The breakaway feature 64 also includes a binding post 66, which is internally threaded to receive the externally threaded end of the shear pin 42. The shear pin 42 is designed such that it shears in response to application of force to the peripheral device 8 (and thus to the mount 20) greater than the threshold force the shear pin 42 is designed to withstand.

The shear pin 42 can have any shape and need not be cylindrical. Furthermore, more than one shear pin can be provided between the mount 20 and the arm 18, such as multiple smaller pins, each with lesser required shear force before they will fail. The shear pin 42 can be made of any material appropriate for its function, such as stainless steel, aluminum, or a strong plastic. Referring briefly to FIG. 3, multiple holes 94a-d can be provided in the surface of the arm 18 that faces the housing 14 to receive the shear pin 42 and binding post 66 in case the electric motor 28 is not operating properly to move the arm 18. The user can place the shear pin 42 in one of the other holes 94a-d to hold the arm 18 and thus mount 20 at a desired angle with respect to the housing 14. In the instance in which the peripheral device is a light, this may allow the user to meet U.S. Coast Guard requirements if the motor and/or drive train of the assembly 10 is/are malfunctioning.

After the shear pin 42 is sheared, the peripheral device and mount 20 are free to pivot with respect to the arm 18, about pivot axis P2 defined along bolt 40. Thus, if the peripheral device 8 and/or mount 20 are contacted by an object that might otherwise break or damage the peripheral device 8, they are able to break away from the arm 18 with only the shear pin 42 having been sacrificed. This also prevents damage to the housing 14 and motor 28 therein, which may be expensive or difficult to replace if the force on the peripheral device 8 and/or mount 20 were otherwise allowed to be transferred thereto via the arm 18. The breakaway feature 64 further prevents damage to the surface of the vessel on which the housing 14 is mounted, as the housing 14 might otherwise be ripped out of the vessel's surface if the peripheral device 8 and assembly 10 are strong enough not to break upon contacting an object.

FIGS. 8-11 illustrate another embodiment of an arm 218 and a mount 220 for attachment to the housing 14 shown in FIGS. 1-7. In this embodiment, the arm 218 has two sides 218a, 218b that straddle the housing 14, each of which has a barrel-shaped portion that connects to the other by way of a bolt 274 (FIG. 10) to form a middle portion 218c. The side 218b of the arm 218 is configured to be located on the side of the housing 14 shown in FIG. 2, while the side 218a of the arm 218 is configured to be located on the side of the housing 14 shown in FIG. 1. Thus, the projection 44 on the housing 14 fits into the channel 246 having ends 248, 250 that act as hard stops for the travel of the arm 218 with respect to the housing 14. The arm 218 can be connected to the housing 14 by way of a bolt such as that shown at 38 in FIG. 2. The electric motor 28 can pivot the arm 218 about the pivot axis P1 in the same manner as that described herein above with respect to FIGS. 1-7 in order to extend and retract a peripheral device attached to the threaded portion 222 of the mount 220.

Figure 9:
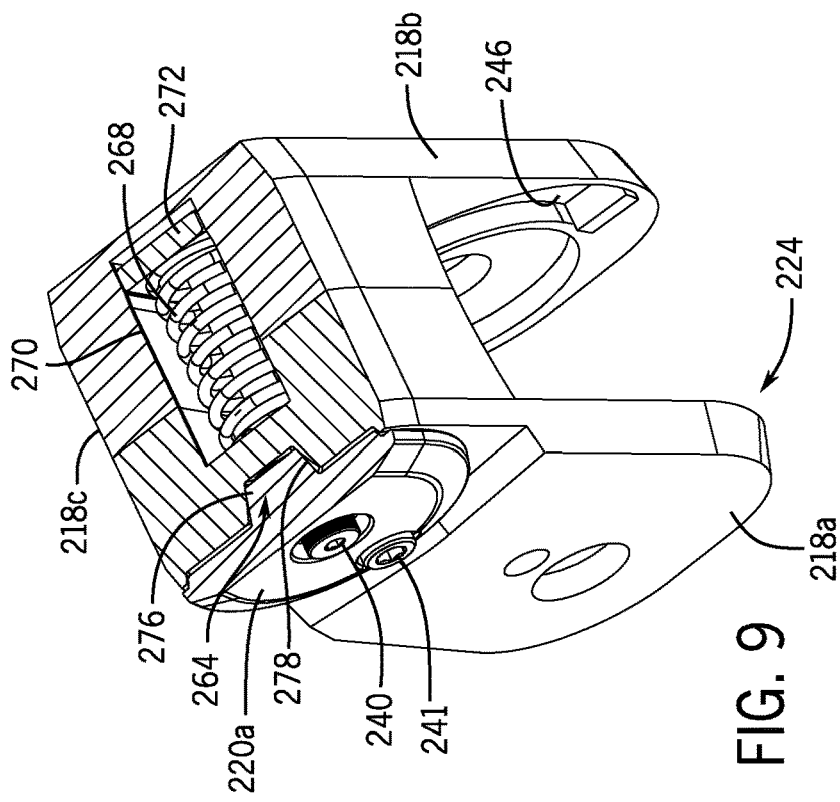
FIG. 9 is a cross section of the assembly of FIG. 8, taken along the line 9-9 in FIG. 8.
Figure 11:
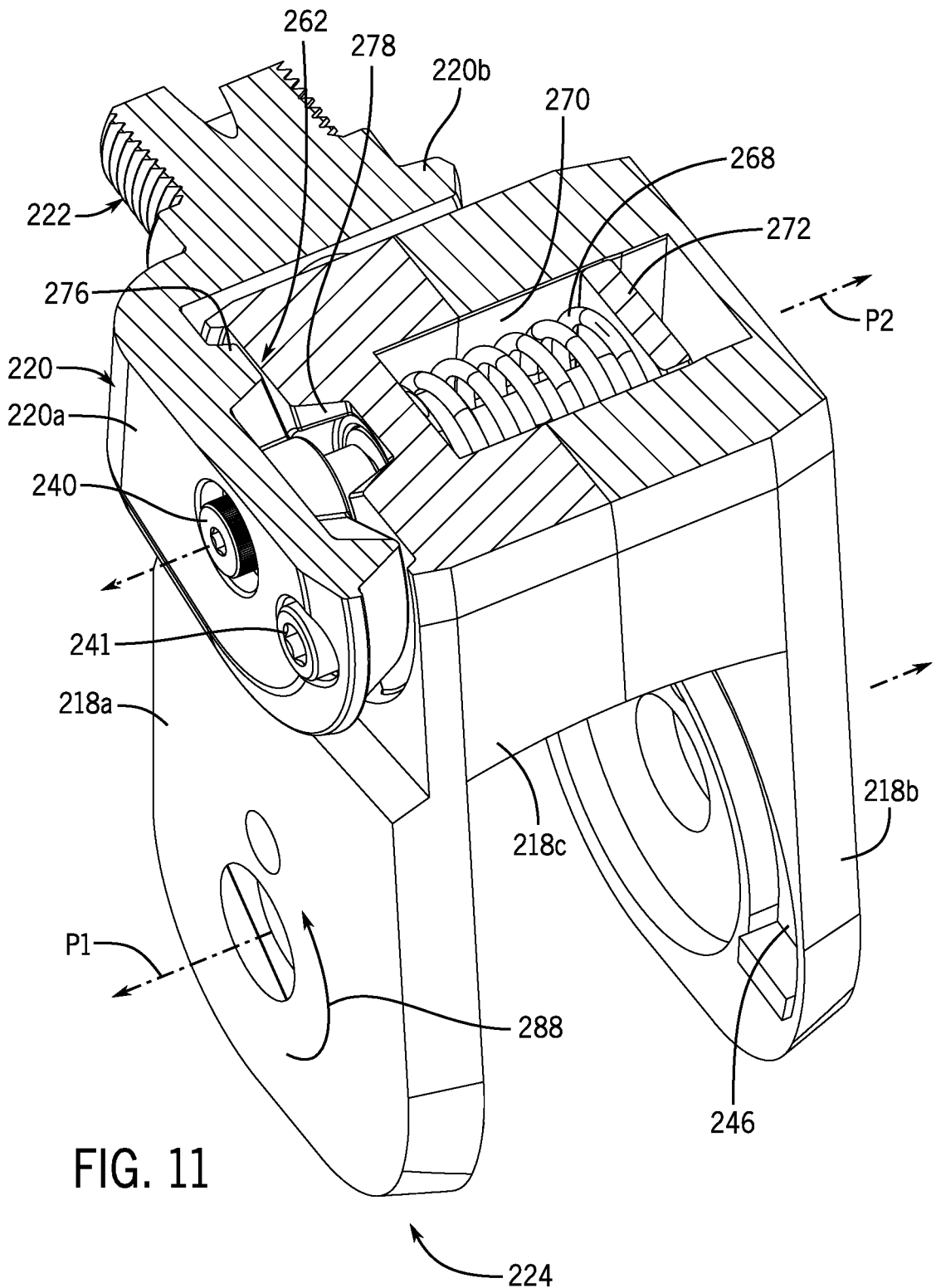
FIG. 11 is a cross-sectional view of the assembly of FIGS. 8-10, taken with the mount pivoted with respect to the arm.

The mount 220 is L-shaped and has one side 220a connected to the middle portion 218c of the arm 218 by way of a bolt 240. The other side 220b of the mount 220 supports the threaded portion 222. FIGS. 9 and 11 show how the bolt 240 is surrounded by a tension spring 268, which is housed in a bore 270 within the middle portion 218c of the arm 218. The spring 268 biases the side 220a of the mount 220 against the middle portion 218c of the arm 218. The spring 268 is seated on an end plate 272 within the bore 270, which end plate 272 is attached to a threaded end of the bolt 240 and thus moves laterally with the bolt 240. A set screw 241 can be rotated to force the side 220a of the mount 220 away from the arm 218 and thus pre-compress the spring 268, for purposes described herein below.

Figure 10:
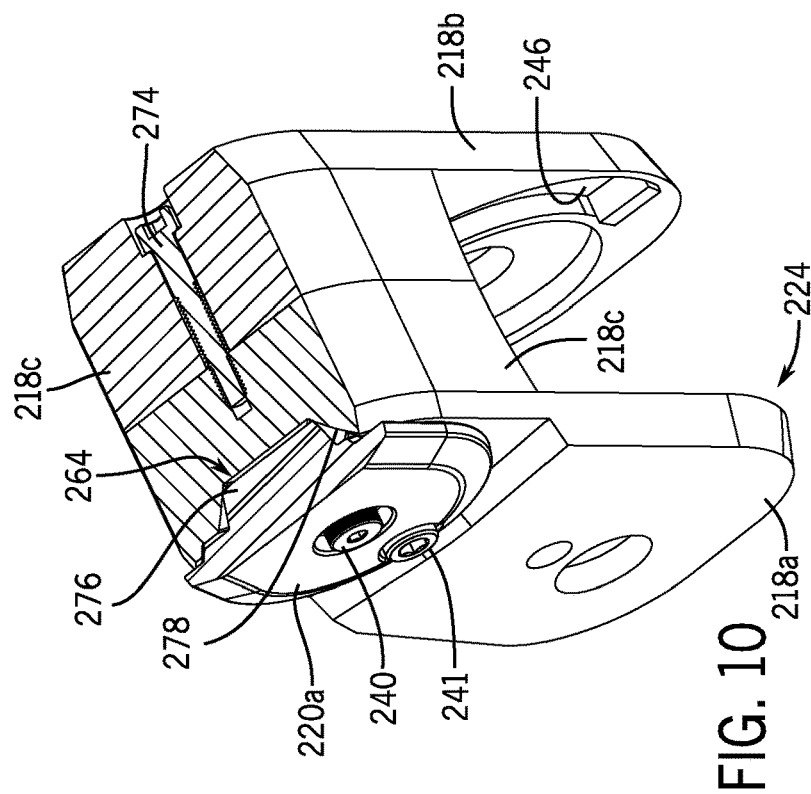
FIG. 10 is a cross section of the assembly of FIG. 8, taken along the line 10-10 in FIG. 8.

As shown in FIGS. 9 and 10, the surface of the side 220a of the mount 220 that faces the surface of the arm 218 is provided with a protrusion 276 that tapers from a wider width near its top (FIG. 10) to a narrower width near its bottom (FIG. 9). The protrusion 276 on the mount 220 is received in a notch 278 within the middle portion 218c of the arm 218. The protrusion 276 is configured to remain seated in the notch 278 unless force greater than a given threshold force is applied to the mount 220. Upon application of force greater than the threshold, the spring force of the spring 268 is overcome, the protrusion 276 ascends the ramped surface of the notch 278, and the mount 220 is allowed to pivot about pivot axis P2. One such pivoted position is shown in FIG. 11. As illustrated by the position of the end plate 272 in FIG. 9 versus in FIG. 11, it can be seen that once the protrusion 276 is no longer seated in the notch 278, the spring 268 is compressed laterally to absorb the energy of the impact from the obstacle and to transfer it to the mount 20 and arm 18. Thus, the physical characteristics of the spring 268, as well as the pre-compression applied thereto by way of positioning the end plate 272, will affect the predetermined threshold force required to be applied to the mount 220 before it will pivot.

Note that the notch could instead be provided in the mount 220 and the protrusion could be provided on the arm 218. Thus, the breakaway feature 264 in this embodiment comprises a notch on one of the mount 220 and the arm 218 and a mating protrusion on the other of the arm 218 and the mount 220. Further, although a tension spring 268 is shown here, the spring could instead by a torsion spring compressed and unwound normal to its coiled axis. Other features, such as additional notches on the face of the middle portion 218c of the arm 218, could serve to provide setpoints for the broken-away mount 220, which could pivot to the setpoint notch(es) instead of all the way to the fully retracted position if full retraction was not necessary in order to avoid the obstacle.

The precompression of the spring 268, such as by way of set screw 241, can allow the assembly 200 to be used with peripheral devices having various weights and/or rigidities. For example, the pre-compression can be lessened for a lighter weight or more rigid pole/peripheral device, and made greater for a heavier or more flexible pole/peripheral device. This would allow a lighter more breakable device to breakaway more easily, with there being less chance that wind would affect the lighter device and trigger a breakaway. Additionally, the assembly 200 could be provided with marks or perceivable detent positions for different weights of devices, where a first noted precompression position of the device (e.g., set screw 241) used to compress the spring 268 could be used for a peripheral device of 5-10 pounds, a second precompression position could be used for a peripheral device of 10-15 pounds, and so on.

Instead of the protrusion 276 and notch 278, the breakaway feature could comprise other known resettable assemblies for allowing selective movement between two parts. For example, the breakaway feature could comprise teeth, ratchets, or gears that can rotate with respect to one another under a given force, but which a spring returns to meshed relationship after the breakaway force is removed. Similarly, the breakaway feature could be a ball-detent system, a ball clutch, or another type of clutch assembly. One face of the mount 220 could be a curved, helical face, where further from the center of the surface, the angle decreases and the contact between the faces becomes point or line contact instead of full contact. In still other examples, the mount 220 could utilize a ball-and-socket type joint, with the parts being pivotable in all directions with respect to one another to allow for various breakaway directions.

In both the embodiments of FIGS. 1-7 and FIGS. 8-11, the housing 14 is configured to be connected to the supporting surface 12; the first ends 24, 224 of the arms 18, 218 are pivotably coupled to the housing 14; and the mounts 20, 220 are coupled to the second ends 26, 226 of the arm 18, 218 by way of the breakaway feature 64, 264. In contrast, in the embodiment of the assembly 310 shown in FIGS. 12 and 13, a first end 324 of the arm 318 is pivotably coupled to a housing 314 at a first location 380 a second end 326 of the arm 318 is coupled to the supporting surface 12 (here, by way of bracket 382), and the mount 320 is coupled to the housing 314 at a different second location 384 by way of the breakaway feature. The bracket 382 can be designed to allow the entire assembly of the arm 318, housing 314, and mount 320 to pivot (by manual manipulation) with respect to the mounting surface 12. The breakaway feature could be similar to the breakaway feature 64 of FIGS. 1-7 or similar to the breakaway feature 264 of FIGS. 8-11. In either case, the breakaway feature is located between the housing 314 and the mount 320, and the breakaway feature allows the mount 320 and the peripheral device 308 to pivot with respect to the housing 314 in response to application of force to the mount 320 greater than a given threshold force. For example, the mount 320 and peripheral device 308 can pivot from the extended position shown in FIG. 12 to the retracted position shown in FIG. 13.

Similar to the embodiment described herein above, the housing 314 can house an electric motor, which can be geared to the arm 318 in such a manner that allows the electric motor to change the orientation of the housing 314 and the arm 318 with respect to one another. For example, while the arm 318 remains stationary, the electric motor can pivot the housing 314 and the mount 320 coupled thereto about pivot axis P3 (FIG. 13). The assembly 310 in FIGS. 12 and 13 can otherwise operate in the same manner as that described herein above, with the electric motor being configured to stop or reverse the direction of the housing 314 and mount 320 in response to the current provided to the motor exceeding a predetermined threshold, and with this feature being turned off when the housing 314 nears its hard stops. For example, the assembly 310 can be provided with set screws 390*a*, 390*b* in a channel 392 that serve as hard stops for the travel of the housing 314 under the power of the motor.

If a resettable breakaway feature like 264 is used, in both the embodiments of FIGS. 7-11 and FIGS. 12-13, the controller 56 can be configured to pivot the housing 14, 314 and arm 218, 318 with respect to one another so as to reset the breakaway feature 264 after the mount 220, 320 and the peripheral device have pivoted with respect to the housing 14, 314 in response to application of force to the mount 220, 320 greater than the given threshold force. For example, referring to FIG. 11, after the mount 220 has pivoted with respect to the arm 218 as shown, the electric motor 28 can be used to rotate the arm 218 with respect to the housing 14 about pivot axis P1 in direction of arrow 288. Assuming the peripheral device contacts a surface of the vessel in its retracted position, the mount 220 will not be able to rotate as far as the arm 218. Thus, the arm 218 will continue to rotate until it eventually re-aligns with the mount 220, and once the arm 218 is again aligned with the mount 220, the protrusion 276 will spring back into the notch 278. The breakaway feature 264 will then be reset and the arm 218 can be pivoted in the direction opposite the arrow 288 to raise the re-aligned components. Similarly, referring to FIG. 13, the motor can be used to rotate the housing 314 about pivot axis P3 in the direction or arrow 388 until the peripheral device 308 contacts the mounting surface 12. Further rotation of the housing 314 will re-align the housing 314 with the mount 320 and reset the breakaway feature 264. The housing 314 and mount 320 can then be rotated together in a direction opposite that of arrow 388 to return the assembly 310 to the position shown in FIG. 12. In this and other examples, the mount's position can also be reset manually by the operator pulling the mount 220, 320 to the desired position. In still other examples, a spring can be incorporated into the assembly to re-set the position of the mount 220, 320 to the extended position.

Figure 12:
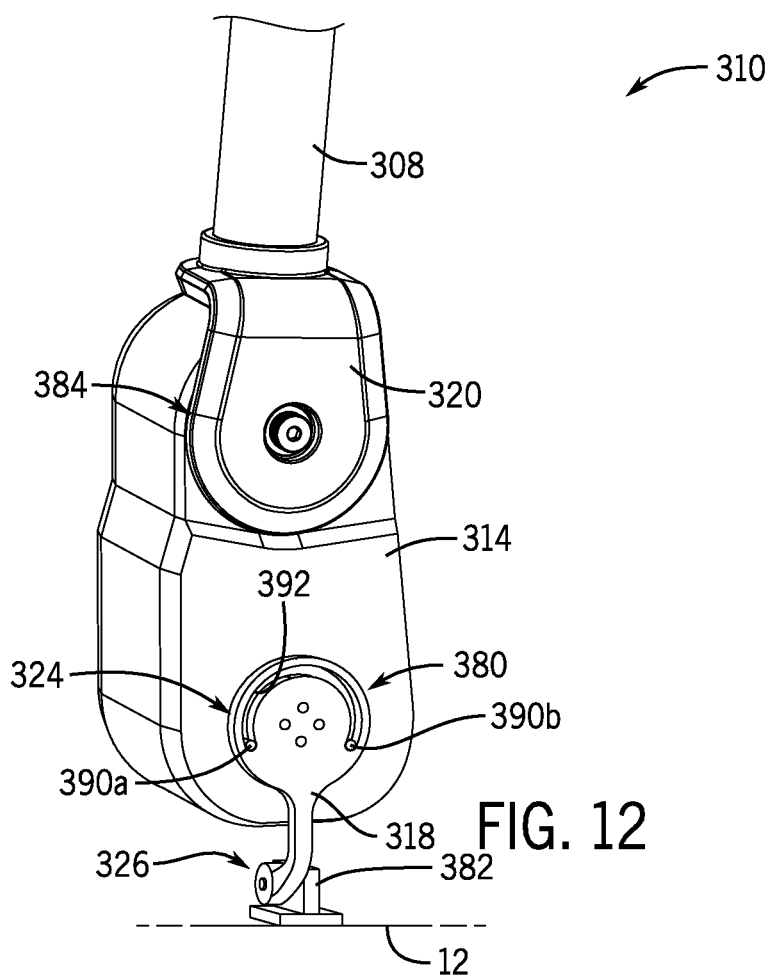
FIG. 12 is a perspective view of another embodiment of an assembly for extending and retracting an elongated peripheral device with respect to a supporting surface of a marine vessel.
Figure 13:
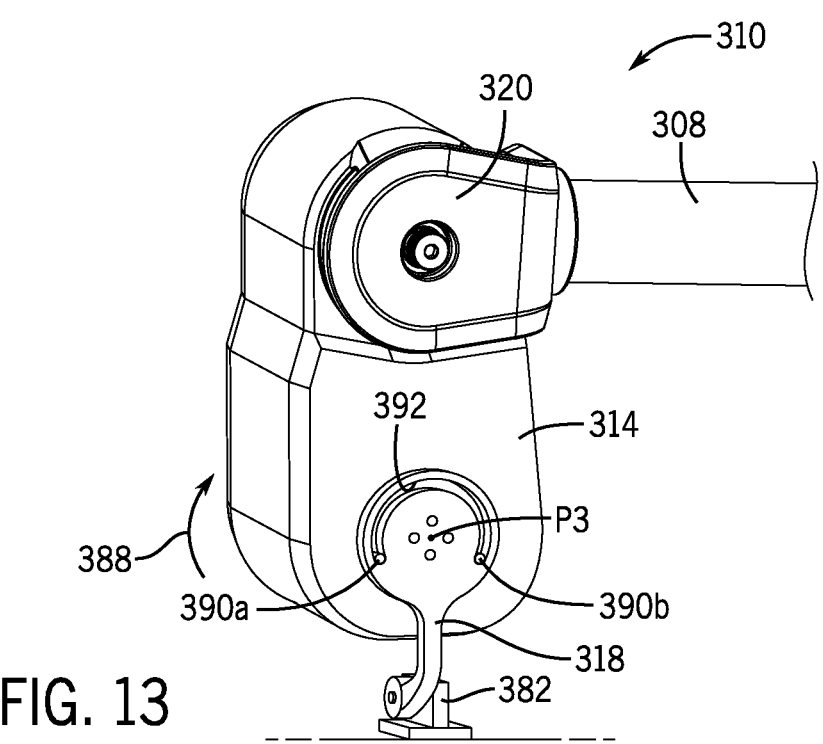
FIG. 13 shows the assembly of FIG. 12 with the mount and the elongated peripheral device attached thereto in a pivoted position.

Note that the same reset feature is not available for the embodiment of FIGS. 1-7 or in the event a shear pin is used as the breakaway feature in the embodiment of FIGS. 12 and 13. Once the shear pin 42 is broken, it must be removed and replaced before the assembly 10, 310 can again be configured in the extended position. Having the binding post 66 allows for easy removal of the shear pin 42, as the end of the shear pin 42 is accessible from the outside of the mount 20 and the end of the binding post 66, into which the shear pin 42 broke off, is also accessible from the outside of the mount 20.

Currently, if a peripheral device, such as an antenna or light, having or being located on a motorized extended pole encounters an obstruction, the motor driving the pole continues to operate to drive the peripheral device to the intended position, whether that be the extended position or retracted position. Continually attempting to move the device toward the intended position despite the presence of an obstacle could result in the pole and/or peripheral device breaking and/or causing injury. Prior art solutions use a torsion spring to absorb the impact upon collision, allowing the pole to deflect to reduce the likelihood of permanent damage. However, such a solution does not reverse the pole to the previous position, nor can it conclusively prevent permanent damage, such as if the pole is dragged under an obstruction for some distance. Other known solutions use a fiberglass or other composite for the pole, which can bend under an overhead obstruction and snap back into place when the obstruction is removed. However, these poles are prone to failure when the obstruction is more than momentary. Through research and development, the present inventors discovered that it was possible to determine when the peripheral device and/or pole encountered an obstruction, and thereafter to stop or reverse the motor to prevent extensive damage to the peripheral device and/or pole. The above-noted current-monitoring solution allows for the pole to be moved out of the way of the obstruction, thereby lessening the likelihood of permanent damage.

Note that the back-drive feature of the above-noted assemblies 10, 210, 310 (in which the motor stops or reverses the pivoting of the mount upon the mount encountering an obstacle) is generally used while the motor is in the process of extending or retracting the mount. If the mount is fully extended and encounters an obstacle, the breakaway feature is then activated instead. Likely, while the boat is underway, the motor would not be fast enough to retract the mount in time to prevent damage from an object external to the boat (e.g., a bridge), and thus the breakaway feature offers a faster way to protect the peripheral device. In contrast, while the mount is being extended or retracted, the contact is more likely to come from an object that is part of or on the boat (e.g., a person, another piece of equipment) and the speed of the motor as it back-drives will be sufficient to prevent the peripheral device from being damaged.

Although the above embodiments show the motor 28 being geared to the arm 18, 218, 318 and the arm pivoting in response to the motor 28 being turned on, other arrangements are envisioned as being combinable with the current-sensing stop and/or back-drive function and/or the breakaway feature described hereinabove. For example, the peripheral device could be extended and retracted by way of an electric linear actuator or other similar type of pre-packaged actuator. The peripheral device could comprise a telescoping pole instead of a pivoting pole, raisable and lowerable by a linear actuator or a pulley-type assembly. In still other examples, the pole could be foldable or otherwise collapsible.

Although the devices shown herein are shown as being pivoted by the motor 28 with respect to the housing 14, 314 or broken-away in a given exemplary direction, it should be understood that certain embodiments of the devices allow for motor-driven pivoting and/or breakaway of the mount 20, 220, 320 in more than one direction. For embodiments in which pivoting is possible only in one direction due to the design of the channels 46, 246, it is easy for one of ordinary skill in the art to see how the orientation and position of the channels could be changed to reverse the allowable range of pivoting.

Additionally, in some examples, the mount 20, 220, 320 and the arm 18, 218, 318 can be coupled to the housing 14, 314 such that their pivot axes are co-axial. The mount (with the breakaway feature) could be located between the housing and the arm, or the arm could be located between the housing and the mount.

In further examples, electrical contacts could be provided in the mount 20, 220, 320 such that if the mount 20, 220, 320 is in the extended position, the electrical contacts are touching and power is able to be provided to the peripheral device, such as a light. However, if the mount 20, 220, 320 is in the retracted position or anywhere but the extended position, the electrical contacts will not touch and power cannot be provided to the peripheral device. The controller 56 can be configured to monitor whether the current draw to the peripheral device is within a normal range, and if not, may determine that the peripheral device has broken away. This might be especially helpful on a large boat or in another instance when the peripheral device is not easily viewable by the operator. When the peripheral device is required to be provided with power, the wire or cable providing such power is provided with enough slack that the mount 220 can rotate with respect to the arm 18, 218, 318 and the arm 18, 218, 318 can rotated with respect to the housing without the cable or wire being broken.

In the present description, certain terms have been used for brevity, clarity, and understanding. No unnecessary limitations are to be implied therefrom beyond the requirement of the prior art because such terms are used for descriptive purposes only and are intended to be broadly construed. The different systems described herein may be used alone or in combination with other systems. Various equivalents, alternatives, and modifications are possible within the scope of the appended claims.

What is claimed is:

1. An assembly for extending and retracting an elongated peripheral device with respect to a supporting surface of a marine vessel, the assembly comprising:
    a housing configured to be coupled to the supporting surface;
    an arm pivotably coupled to the housing;
    an electric motor located in the housing and having an output shaft coupled to the arm, the electric motor configured to change an orientation of the housing and the arm with respect to one another;
    a controller configured to control power provided to the electric motor; and
    a mount coupled to the housing, the mount configured to support the peripheral device;
    wherein the assembly is configured such that as the electric motor changes the orientation of the housing and the arm with respect to one another, the mount and the peripheral device are simultaneously extended or retracted with respect to the supporting surface; and
    wherein the controller is configured to:
        vary the power provided to the electric motor in response to determining that the peripheral device has encountered an obstacle while being extended or retracted with respect to the supporting surface;
        reverse a direction of the electric motor's output shaft in response to determining that the peripheral device has encountered the obstacle while being extended or retracted with respect to the supporting surface; and
        not to reverse the direction of the electric motor's output shaft in response to determining that the mount is within a threshold distance of being fully extended or fully retracted with respect to the supporting surface.

2. The assembly of claim 1, further comprising a breakaway feature located between the housing and the mount, wherein the breakaway feature allows the mount and the peripheral device to pivot with respect to the housing in response to application of force to the mount greater than a given threshold force.

3. The assembly of claim 2, wherein a first end of the arm is pivotably coupled to the housing at a first location and a second end of the arm is coupled to the supporting surface, and wherein the mount is coupled to the housing at a different second location by way of the breakaway feature.

4. The assembly of claim 2, wherein the housing is configured to be connected to the supporting surface, wherein a first end of the arm is pivotably coupled to the housing, and wherein the mount is coupled to a second end of the arm by way of the breakaway feature.

5. The assembly of claim 4, wherein the breakaway feature comprises a shear pin connected between the mount and the arm that prevents the mount from pivoting with respect to the arm unless force greater than the given threshold force is applied to the mount.

6. The assembly of claim 4, wherein the breakaway feature comprises a notch on one of the mount and the arm and a mating protrusion on the other of the arm and the mount, and the protrusion is configured to remain seated in the notch unless force greater than the given threshold force is applied to the mount.

7. The assembly of claim 2, wherein the controller is configured to pivot the housing and the arm with respect to one another so as to reset the breakaway feature after the mount and the peripheral device have pivoted with respect to the housing in response to application of force to the mount greater than the given threshold force.

8. The assembly of claim 1, wherein the controller is configured to determine that the peripheral device has encountered the obstacle by determining that a current provided to the electric motor is above a predetermined threshold current.

9. An assembly for extending and retracting an elongated peripheral device with respect to a supporting surface of a marine vessel, the assembly comprising:
    a housing configured to be coupled to the supporting surface;
    an arm having a first end pivotably coupled to the housing;
    an electric motor located in the housing and having an output shaft coupled to the arm, the electric motor configured to pivot the arm with respect to the housing;
    a controller configured to control power provided to the electric motor; and
    a mount coupled to a second end of the arm, the mount configured to support the peripheral device;
    wherein the assembly is configured such that as the electric motor pivots the arm with respect to the housing, the mount and the peripheral device are simultaneously extended or retracted with respect to the supporting surface; and
    wherein the controller is configured to:
        vary the power provided to the electric motor in response to determining that the peripheral device has encountered an obstacle while being extended or retracted with respect to the supporting surface, wherein the controller determines that the peripheral device has encountered the obstacle by determining that a current provided to the electric motor is above a predetermined threshold current;
        reverse a direction of the electric motor's output shaft in response to determining that the peripheral device has encountered the obstacle while being extended or retracted with respect to the supporting surface; and not to reverse the direction of the electric motor's output shaft in response to determining that the mount is within a threshold distance of being fully extended or fully retracted with respect to the supporting surface, despite having determined that the current provided to the electric motor is above the predetermined threshold current.

10. The assembly of claim 9, further comprising a breakaway feature located between the arm and the mount, wherein the breakaway feature allows the mount and the peripheral device to pivot with respect to the arm in response to application of force to the mount greater than a given threshold force.

* * * * *